US011560238B2

United States Patent
Eppink et al.

(10) Patent No.: US 11,560,238 B2
(45) Date of Patent: Jan. 24, 2023

(54) PROVIDING A LOAD FROM A MOTOR TO INHIBIT FURTHER ROTATION OF A PROPELLER OF AN AERIAL VEHICLE WHILE IN FLIGHT

(71) Applicant: Textron Systems Corporation, Hunt Valley, MD (US)

(72) Inventors: James Eppink, York, PA (US); Surendra Vyas, Catonsville, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 330 days.

(21) Appl. No.: 16/874,038

(22) Filed: May 14, 2020

(65) Prior Publication Data

US 2021/0229825 A1 Jul. 29, 2021

Related U.S. Application Data

(60) Provisional application No. 62/965,230, filed on Jan. 24, 2020.

(51) Int. Cl.
*B64C 29/00* (2006.01)
*B64D 27/24* (2006.01)
(Continued)

(52) U.S. Cl.
CPC ............ *B64D 35/04* (2013.01); *B64C 11/00* (2013.01); *B64C 29/0025* (2013.01); *B64C 39/024* (2013.01); *B64D 27/24* (2013.01); *B64D 31/06* (2013.01); *B64D 35/02* (2013.01); *B64C 2201/02* (2013.01); *B64C 2201/042* (2013.01); *B64C 2201/108* (2013.01)

(58) Field of Classification Search
CPC ..... B64C 29/0025; B64C 27/30; B64C 31/06; B64D 27/24
See application file for complete search history.

(56) References Cited

U.S. PATENT DOCUMENTS 3,948,936 A  4/1976 Cross et al.
4,882,524 A * 11/1989 Lee .......................... H02P 6/10
                                                    318/400.4
(Continued)

FOREIGN PATENT DOCUMENTS

WO   WO-2015157114 A1 * 10/2015 ......... B64C 29/0025

*Primary Examiner* — Timothy D Collins
*Assistant Examiner* — Justin Michael Heston
(74) *Attorney, Agent, or Firm* — BainwoodHuang

(57) ABSTRACT

A technique for operating an aerial vehicle involves enabling a vertical takeoff and landing (VTOL) propeller of the aerial vehicle to rotate freely. The VTOL propeller is coupled with a VTOL motor (e.g., a 3-phase brushless DC motor). The technique further involves detecting when the VTOL propeller rotates to a predefined position relative to a direction of flight for the aerial vehicle (e.g., when blades of the VTOL propeller extend along an axis that is parallel to the direction of flight). The technique further involves, in response to detecting that the VTOL propeller has rotated to the predefined position, providing a load from the VTOL motor that inhibits further rotation of the VTOL propeller. Accordingly, while the aerial vehicle is in fixed wing horizontal flight, the controller is able to align the VTOL propeller in the direction of horizontal flight to minimize drag from the VTOL propeller.

20 Claims, 8 Drawing Sheets

(51) Int. Cl.
*B64D 31/06* (2006.01)
*B64D 35/04* (2006.01)
*B64C 39/02* (2006.01)
*B64D 35/02* (2006.01)
*B64C 11/00* (2006.01)

(56) References Cited

U.S. PATENT DOCUMENTS

| | | |
|---|---|---|
| 10,065,736 B2 | 9/2018 | Foskey |
| 10,077,106 B2 | 9/2018 | Foskey |
| 10,086,936 B2 | 10/2018 | Foskey |
| 10,167,080 B2 | 1/2019 | Foskey |
| 10,814,958 B2 | 10/2020 | Easley et al. |
| 10,843,797 B2 | 11/2020 | Foskey |
| 10,894,602 B2 | 1/2021 | Hefner et al. |
| 10,899,446 B2 | 1/2021 | Hefner et al. |
| 10,946,956 B2 | 3/2021 | Citterio |
| 11,214,362 B2 | 1/2022 | Foskey et al. |
| 11,273,911 B2 | 3/2022 | Brand et al. |
| 11,422,997 B2 | 8/2022 | Bonazzoli |
| 2017/0225779 A1* | 8/2017 | Gamble ............... B64C 27/30 |

* cited by examiner

PROVIDING A LOAD FROM A MOTOR TO INHIBIT FURTHER ROTATION OF A PROPELLER OF AN AERIAL VEHICLE WHILE IN FLIGHT

CROSS REFERENCE TO RELATED APPLICATIONS

This application is a regular utility of earlier-filed U.S. Application No. 62/965,230, filed on Jan. 24, 2020, the contents and teachings of which are hereby incorporated by reference in their entirety.

BACKGROUND

A conventional drone is capable of vertical takeoff and landing (VTOL) and horizontal fixed-wing flight. For VTOL, the conventional drone operates vertically oriented rotors that provide vertical lift. For horizontal flight, the conventional drone operates one or more horizontally oriented rotors that enable fixed-wings to provide lift in the manner of a standard aircraft.

The vertically oriented rotors of such a conventional drone may include magnets that align the propellers of the vertically oriented rotors with the direction of horizontal flight. Accordingly, when the conventional drone flies horizontally, the propellers of the vertically oriented rotors provide minimal drag and interference.

SUMMARY

Unfortunately, there are drawbacks to the above-described conventional drone that includes magnets that align the propellers of the vertically oriented rotors with the direction of horizontal flight. For example, the always present magnets provide drag on the propellers of the vertically oriented rotors during takeoff and landing thus reducing efficiency of the vertically oriented rotors. Additionally, the magnets prevent the rotors from rotating smoothly and create excess noise. Furthermore, the magnets contribute to rotor wear thus shortening the lifetime of the rotors.

In contrast to the above-described conventional drone that includes magnets that align the propellers of the vertically oriented rotors with the direction of horizontal flight, improved techniques are directed to operating an aerial vehicle in a manner that provides a mechanical load (or brake) from a vertical takeoff and landing (VTOL) motor to inhibit further rotation of a VTOL propeller. Such a load may be provided by simply connecting (or short circuiting) the terminals of the VTOL motor together while the VTOL propeller is aligned with the aerial vehicle's horizontal flight direction. Such connecting results in a load (or mechanical resistance) applied by the motor, which now acts as a generator, that inhibits rotation of the VTOL propeller. As a result, the VTOL propeller remains aligned in a manner that minimizes drag. Moreover, there is no need for magnets and the associated drawbacks.

One embodiment is directed to an aerial vehicle with VTOL capabilities. The aerial vehicle includes a frame, a set of VTOL motors supported by the frame, a set of VTOL propellers coupled with the set of VTOL motors, and a controller supported by the frame. The controller is constructed and arranged to operate each VTOL motor of the set of VTOL motors by:
  (A) enabling a VTOL propeller coupled with the VTOL motor to rotate freely,
  (B) detecting when the VTOL propeller coupled with the VTOL motor rotates to a predefined position relative to a direction of flight for the aerial vehicle, and
  (C) in response to detecting that the VTOL propeller coupled with the VTOL motor has rotated to the predefined position, providing a load from the VTOL motor that inhibits further rotation of the VTOL propeller coupled with the VTOL motor.

Accordingly, while the aerial vehicle is in fixed wing horizontal flight, the controller is able to align each VTOL propeller in the direction of horizontal flight to minimize drag from that VTOL propeller.

Another embodiment is directed to a method of operating an aerial vehicle. The method includes:
  (A) enabling a VTOL propeller of the aerial vehicle to rotate freely, the VTOL propeller being coupled with a VTOL motor;
  (B) detecting when the VTOL propeller rotates to a predefined position relative to a direction of flight for the aerial vehicle; and
  (C) in response to detecting that the VTOL propeller has rotated to the predefined position, providing a load from the VTOL motor that inhibits further rotation of the VTOL propeller.

Yet another embodiment is directed to a computer program product having a non-transitory computer readable medium which stores a set of instructions to operate an aerial vehicle. The set of instructions, when carried out by computerized circuitry, causing the computerized circuitry to perform a method of:
  (A) enabling a vertical takeoff and landing (VTOL) propeller of the aerial vehicle to rotate freely, the VTOL propeller being coupled with a VTOL motor;
  (B) detecting when the VTOL propeller rotates to a predefined position relative to a direction of flight for the aerial vehicle; and
  (C) in response to detecting that the VTOL propeller has rotated to the predefined position, providing a load from the VTOL motor that inhibits further rotation of the VTOL propeller.

Other embodiments are directed to electronic systems and apparatus, processing circuits, computer program products, and so on. Some embodiments are directed to various methods, electronic components and circuitry which are involved in operating an aerial vehicle.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to operating an aerial vehicle in a manner that provides a mechanical load (or brake) from a vertical takeoff and landing (VTOL) motor to inhibit further rotation of a VTOL propeller coupled with the VTOL motor. Such a load may be provided by simply connecting (or short circuiting) the terminals of the VTOL motor to each other while the VTOL propeller is aligned with the aerial vehicle's horizontal flight direction. Such connecting results in a load (or mechanical resistance) from the motor, which now acts as a generator, to inhibit rotation of the VTOL propeller. Accordingly, the VTOL propeller remains aligned in a manner that minimizes drag. As a result, there is no need for magnets and the associated drawbacks.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
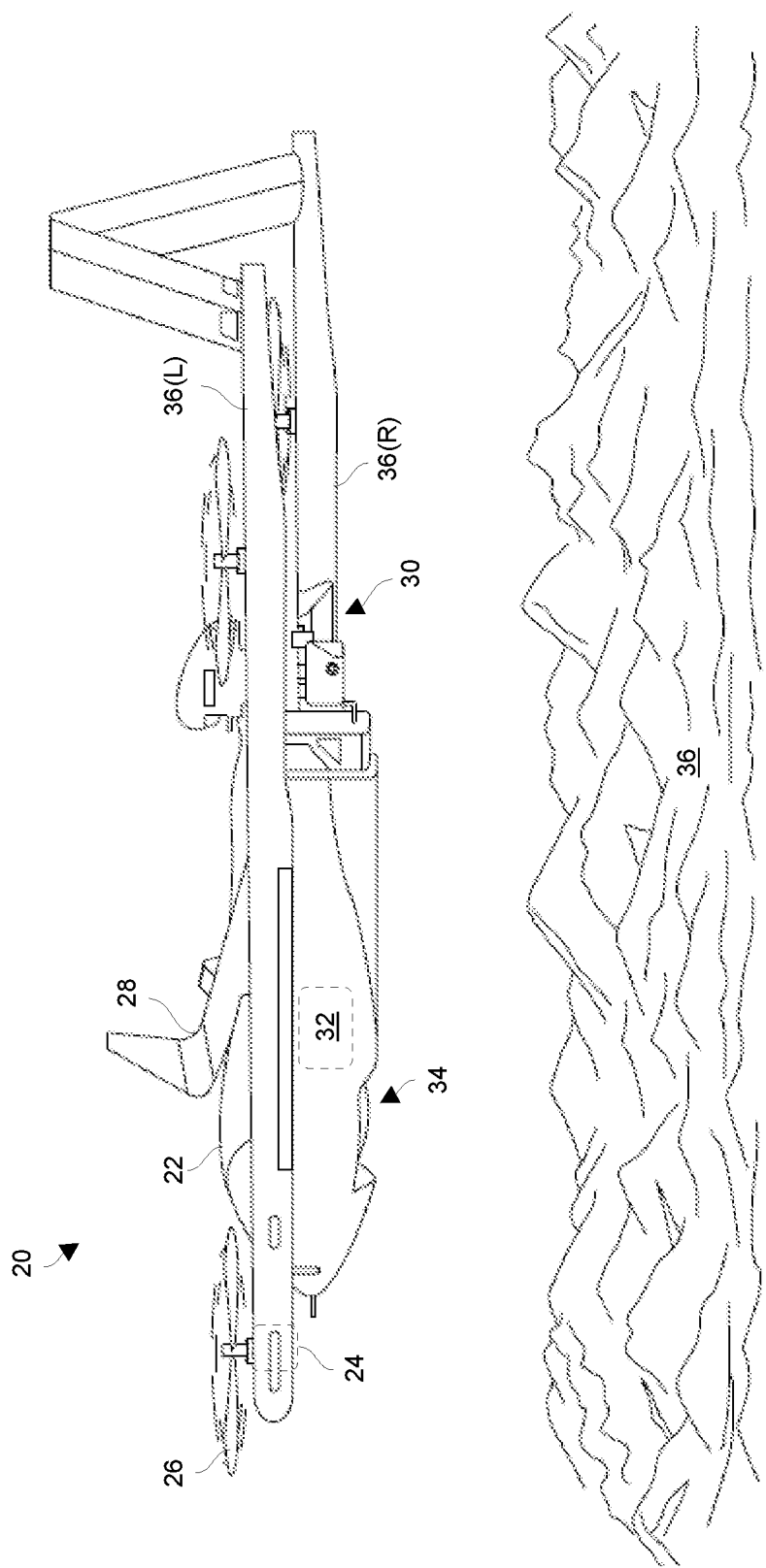
FIG. 1 is a first perspective view of an example aerial vehicle which is capable of providing a mechanical load (or brake) from a vertical takeoff and landing (VTOL) motor to inhibit further rotation of a VTOL propeller in accordance with certain embodiments.

FIG. 1 is a perspective view of an aerial vehicle 20 which is capable of providing a mechanical load (or brake) from a VTOL motor to inhibit further rotation of a VTOL propeller in accordance with certain embodiments. In accordance with certain embodiments, the aerial vehicle 20 includes a frame 22, a set of VTOL motors 24, a set of VTOL propellers 26, a fixed wing 28, a set of horizontal propulsion devices 30, a controller 32, and other elements 34.

The frame 22 is constructed and arranged to support, among other things, the set of VTOL motors 24, the fixed wing 28, and the set of horizontal propulsion devices 30. The frame 22 may perform other operations as well such as provide aerodynamic surfaces to facilitate flight and flight control, enclose/shield various items/payloads (e.g., fuel, equipment, cargo, other types of payloads, etc.), deploy items, combinations thereof, and so on.

The set of VTOL motors 24 is supported by the frame 22 and couples with the set of VTOL propellers 26. Each VTOL motor 24 is constructed and arranged to rotate a respective VTOL propeller 26 to generate lift (i.e., a rotor rotates within a stator that is stationary with respect to the frame 22). In accordance with certain embodiments, the VTOL motors 24 are multi-phase electric motors (e.g., 3-phase brushless DC motors).

The set of VTOL propellers 26 couple with the set of VTOL motors 24. Each VTOL propeller 26 includes a set of blades (e.g., two blades, three blades, four blades, etc.) and is constructed and arranged to turn in response to rotation of a respective VTOL motor 24 to provide vertical lift.

The fixed wing 28 is supported by the frame 22. The fixed wing 28 is constructed and arranged to provide lift to the aerial vehicle 20 in the manner of a standard aircraft during times of forward horizontal flight. In accordance with certain embodiments, the fixed wing 28 may include movable control surfaces for direction control of aerial vehicle 20 (e.g., to control pitch, yaw and roll, to perform aerial maneuvers, to perform other steering activities, etc.). It should be understood that the aerial vehicle 20 may include one or more other control surfaces that provide additional lift and/or direction control (e.g., one or more other wings, ailerons, tabs, rudders, combinations thereof, etc.).

The set of horizontal propulsion devices 30 (i.e., one or more horizontal propulsion device 30) is supported by the frame 22. The set of horizontal propulsion devices 30 is constructed and arranged to propel the aerial vehicle 20 in the forward horizontal direction (i.e., provide forward thrust). By way of example, the aerial vehicle 20 will be further described as including one horizontal propulsion device 30 but it should be understood that other numbers of horizontal propulsion devices 30 are suitable for use as well (e.g., two, three, etc.). Additionally, by way of example, the horizontal propulsion device 30 will be illustrated and/or described as including a combustion engine but it should be understood that other types of propulsion devices are suitable for use as well (e.g., an electric motor, a jet engine, combinations thereof, etc.).

The controller 32 is supported by the frame 22 and is constructed and arranged to control the operation of the set of VTOL motors 24. In accordance with certain embodiments, the controller 32 controls one or more other portions of the aerial vehicle 20 (e.g., the set of horizontal propulsion devices 30, control surfaces, communications, other equipment, etc.).

The other elements 34 refer to other parts, componentry, etc. of the aerial vehicle 20. As will be explained in further detail below, such componentry may include sensors, switches, communication equipment, etc.

During operation, the aerial vehicle 20 operates to perform useful work. Such operation may involve vertically taking off from a surface 36 and vertically landing back on the surface 36 which may be convenient for missions in environments where it is dangerous or even impractical to take off and/or land in the manner of a standard aircraft (e.g., in a mountainous region, at sea, in a snow covered environment, etc.). Moreover, such operation does not require other equipment such as a launch ramp, a net, etc.

Once the aerial vehicle 20 has transitioned to horizontal flight via the set of horizontal propulsion devices 30, the controller 32 allows the VTOL propellers 26 to rotate freely and detects when the VTOL propellers 26 align with the vehicle's direction of flight (i.e., when a propeller blade of each VTOL propeller 26 points in the direction of forward horizontal flight). When the VTOL propellers 26 reach alignment, the controller 32 provides loads from the VTOL motors 24 that inhibit further rotation of the VTOL propellers 26. Such propeller alignment minimizes drag from the VTOL propellers 26. Moreover, such operation alleviates the need for alignment magnets that would otherwise interfere with rotation of the VTOL motors 24 leading to inefficiencies, vibration, etc.

By way of example, the aerial vehicle 20 is shown as having a quadcopter configuration. In particular, the frame 22 includes a left beam 36(L) that supports two VTOL motors 24, and a right beam 36(R) that supports two other VTOL motors 24. Other numbers of VTOL rotors are suitable for use as well (e.g., one, two, three, five, and so on). Further details will now be provided with reference to FIG. 2.

Figure 2:
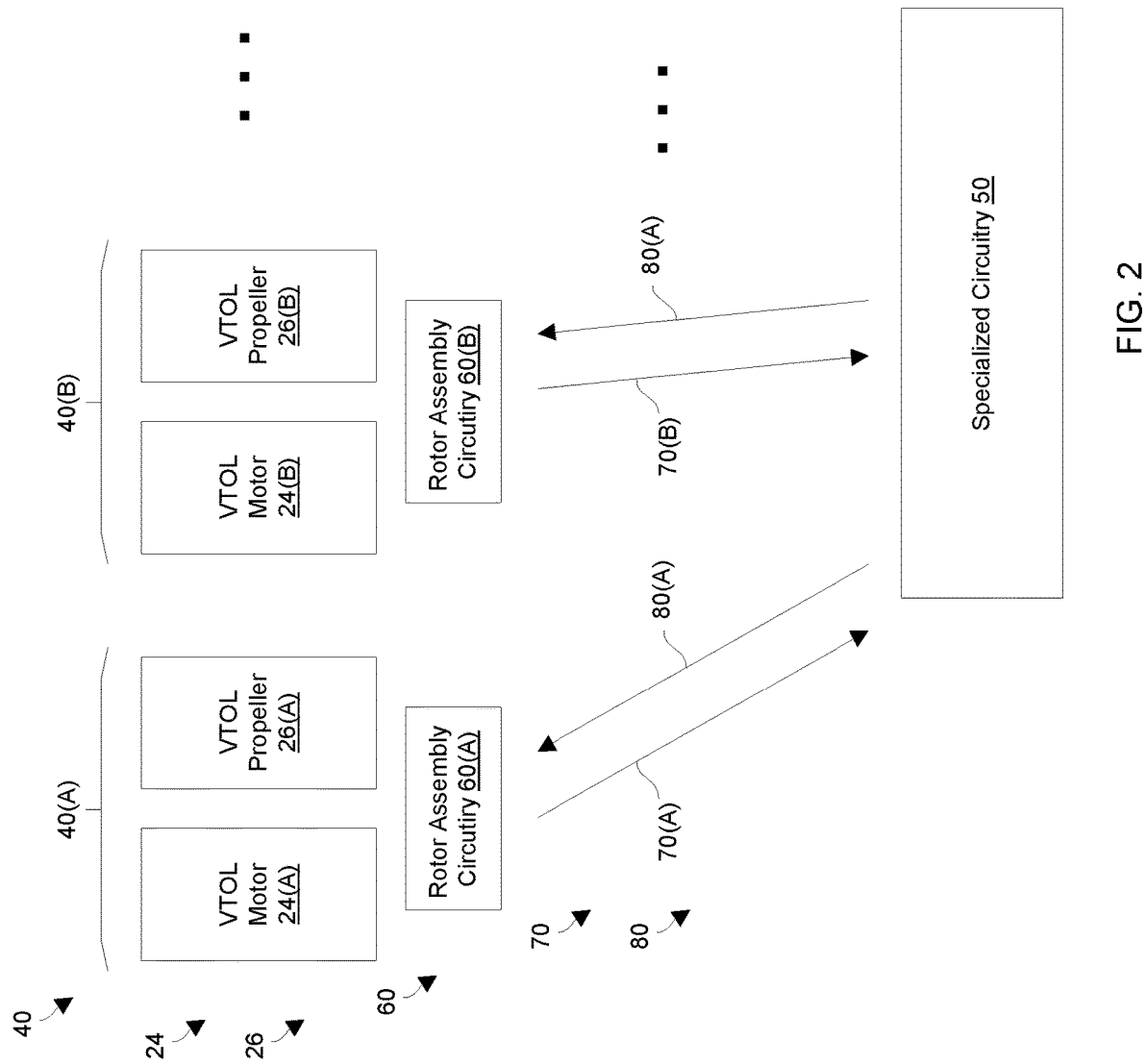
FIG. 2 is a block diagram of particular components of the example aerial vehicle in accordance with certain embodiments.

FIG. 2 shows particular components of the aerial vehicle 20 in accordance with certain embodiments. As shown, the aerial vehicle 20 includes rotor assemblies 40(A), 40(B), . . . (collectively, rotor assemblies 40).

Each rotor assembly 40 is controlled by specialized circuitry 50 (also see the controller 32 in FIG. 1) and includes a VTOL motor 24, a VTOL propeller 26, and rotor assembly circuitry 60. For example, the rotor assembly 40(A) includes a VTOL motor 24(A), a VTOL propeller 26(A), and rotor assembly circuitry 60(A). Likewise, the rotor assembly 40(B) includes a VTOL motor 24(B), a VTOL propeller 26(B), and rotor assembly circuitry 60(B), and so on.

The rotor assembly circuitry 60 of each rotor assembly 40 is constructed and arranged to provide a signal 70 to the specialized circuitry 50 indicating when the VTOL propeller 26 of that rotor assembly 40 is aligned with the direction of flight of the aerial vehicle 20. Additionally, the rotor assembly circuitry 60 of each rotor assembly 40 is constructed and arranged to receive a signal 80 from the specialized circuitry 50 to impart a load (or brake) on the VTOL propeller 26 when the VTOL propeller 26 is aligned with the direction of flight of the aerial vehicle 20. For example, the rotor assembly circuitry 60(A) exchanges signals 70(A), 80(A) with the specialized circuitry 50, the rotor assembly circuitry 60(B) exchanges signals 70(B), 80(B) with the specialized circuitry 50, and so on.

Since the VTOL propeller 26 of each rotor assembly 40 is coupled with the VTOL motor 24 of that rotor assembly 40, the direction of the VTOL propeller 26 may be sensed by monitoring the VTOL propeller 26 (e.g., a shaft of the VTOL propeller 26 with respect to the frame 22). Alternatively, the direction of the VTOL propeller 26 may be sensed by monitoring the VTOL motor 24 (e.g., the rotor within the VTOL motor 24 with respect to the stator of the VTOL motor 24).

Moreover, such sensing may be performed in a variety of different ways, each of which is suitable for use. Along these lines, such sensing may be optical (e.g., in the manner of an encoder), electrical (e.g., when electric contact is made between two aligned terminals), electromagnetically sensed (e.g., via Hall sensors), combinations thereof, and so on.

Furthermore, the loads (or brakes) are provided by electrically connecting the terminals (or power leads) of each VTOL motor 24 to each other. In particular, to provide a load from the VTOL motor 24(A), the rotor assembly circuitry 60(A) electrically connects the terminals of the VTOL motor 24(A) together. Similarly, to provide a load from the VTOL motor 24(B), the rotor assembly circuitry 60(B) electrically connects the terminals of the VTOL motor 24(B) together, and so on.

In accordance with certain embodiments, each VTOL motor 24 is a multi-phase electric motor having different sets of windings for the different phases. For example, each VTOL motor 24 may be a 3-phase brushless direct current (DC) motor having (i) a first set of windings and a first terminal leading to the first set of windings for a first phase, (ii) a second set of windings and a second terminal leading to the second set of windings for a second phase, and (iii) a third set of windings and a third terminal leading to the third set of windings for a third phase.

It should be appreciated that each VTOL motor 24 operates as a generator when spun. In particular, the mechanical load on the rotor (or propeller shaft) is inversely proportional to the electrical resistance (or impedance) presented on the terminals (or power leads) of the VTOL motor 24. Accordingly, when the terminals are shorted together, the VTOL motor 24 provides a load (or brake) on the VTOL propeller 26 (i.e., the VTOL propeller becomes sufficiently difficult to spin). Such a load enables the VTOL motor 24 to hold the VTOL propeller 26 aligned with the direction of flight even in the presence of moderate-to-high forces such as those caused by the wind during forward flight of the aerial vehicle 20.

In accordance with certain embodiments, electrically connecting together the terminals of the VTOL motor 24 of a rotor assembly 40 may be effectuated by a switch (e.g., a relay) within the rotor assembly circuitry 60 of that rotor assembly 40. Along these lines, the signal 80 may control whether the switch is an open position (i.e., the terminals of the VTOL motor 24 are not electrically connector together) or a closed position (i.e., the terminals of the VTOL motor 24 are electrically connector together).

In accordance with other embodiments, electrically connecting together the terminals of the VTOL motor 24 of a rotor assembly 40 may be effectuated by a switch (e.g., a relay) within the specialized circuitry 50. In such a situation, the signal 80 may be the shorting of the power leads of the VTOL motor 24 together.

Figure 3:
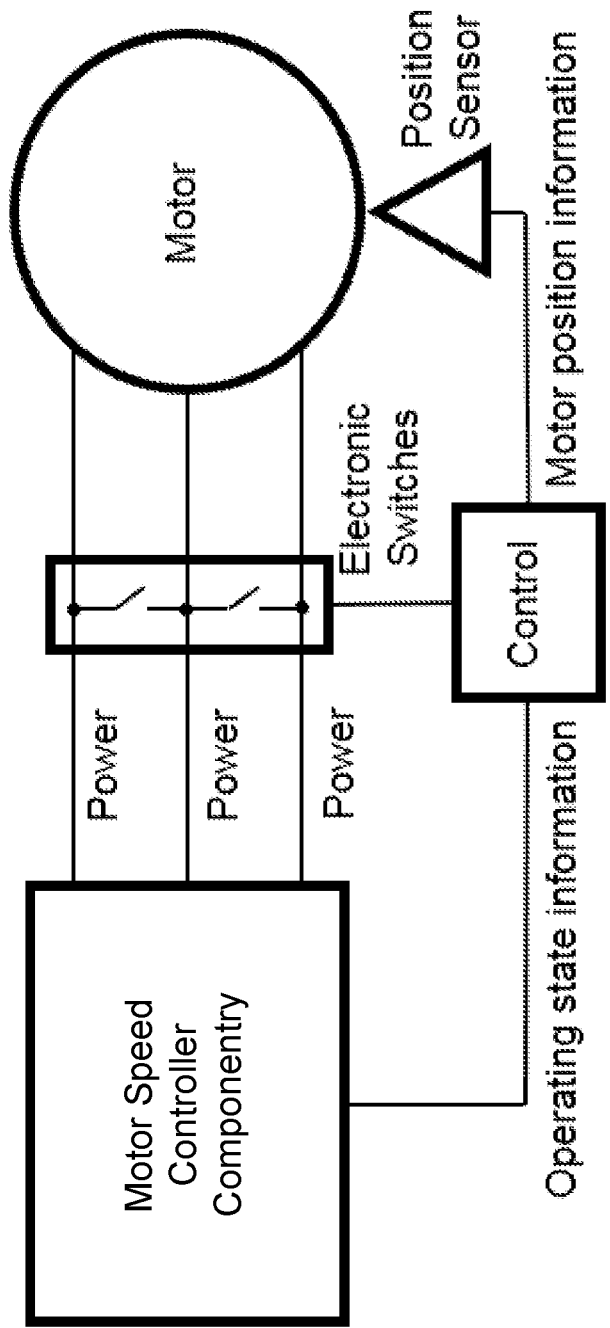
FIG. 3 is a block diagram of certain componentry which is suitable for use by the example aerial vehicle of FIG. 1.

FIG. 3 shows certain componentry which is suitable for use by the aerial vehicle 20 in accordance with certain embodiments. The componentry includes motor speed controller componentry, multiple electronic switches, a VTOL motor, a position sensor, and a control section.

The motor speed controller componentry is constructed and arranged to receive operating state information from the control section. In response to the operating state information, the motor speed controller componentry provides power signals to power leads of the VTOL motor.

The multiple electronic switches couple with the power leads of the VTOL motor. The multiple switches are capable of connecting the power leads together in response to input from the control section.

The VTOL motor couples with a VTOL propeller 26 (also see FIGS. 1 and 2). The VTOL motor is constructed and arranged to rotate the VTOL propeller 26 in response to the power signals from the motor speed controller componentry to provide vertical lift to the aerial vehicle 20.

The position sensor is constructed and arranged to provide motor position information to the control section. It should be understood that, since a VTOL propeller 26 couples with the VTOL motor, the motor position information enables the control section to detect when the VTOL propeller 26 is aligned with the direction of forward flight.

The control section is constructed and arranged to control operation of the motor speed controller circuitry and the multiple switches. In particular, during vertical flight, the control section leaves the switches open and provides operating state information that directs the motor speed controller componentry to provide the power signals to power leads of the VTOL motor to turn the VTOL motor.

Additionally, during horizontal flight, the control section provides operating state information that directs the motor speed controller componentry to terminate delivery of the power signals to the power leads of the VTOL motor. During this time, the control section monitors the motor position information from the position sensor to determine motor position (e.g., the axial orientation of the rotor shaft). The control section closes the switches when the motor position information indicates that the VTOL propeller 26 is aligned with the direction of forward flight. Accordingly, the power leads of the VTOL motor are now connected to each other to generate braking (i.e., a load that holds the VTOL propeller 26 in alignment with the direction of forward flight). Further details will now be provided with reference to FIGS. 4 through 6.

Figure 4:
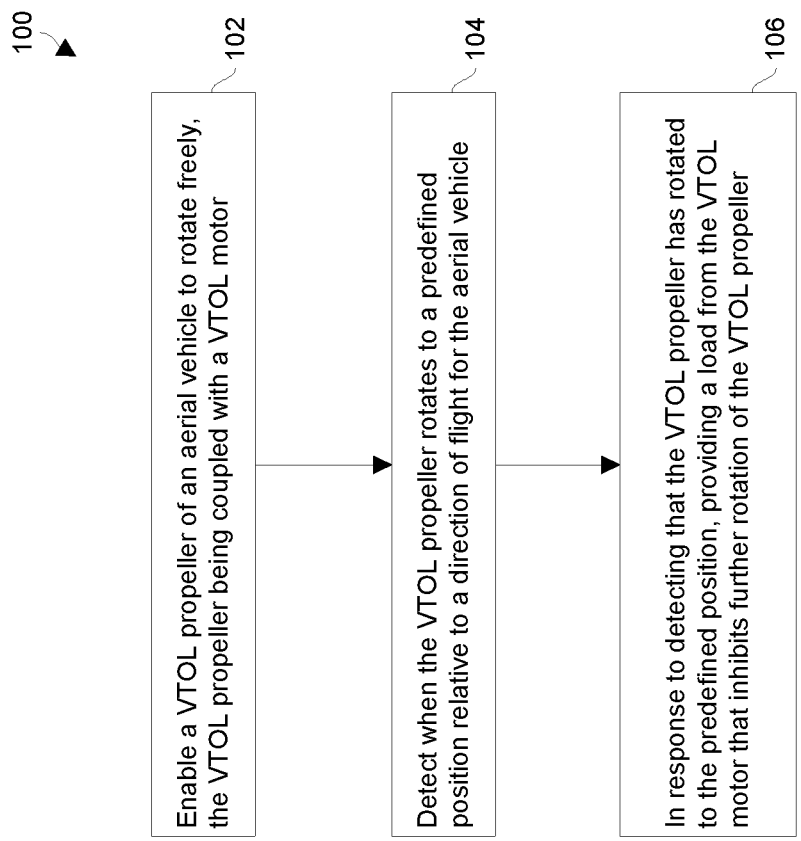
FIG. 4 is a flowchart of a procedure which is performed by the example aerial vehicle in accordance with certain embodiments.
Figure 5:
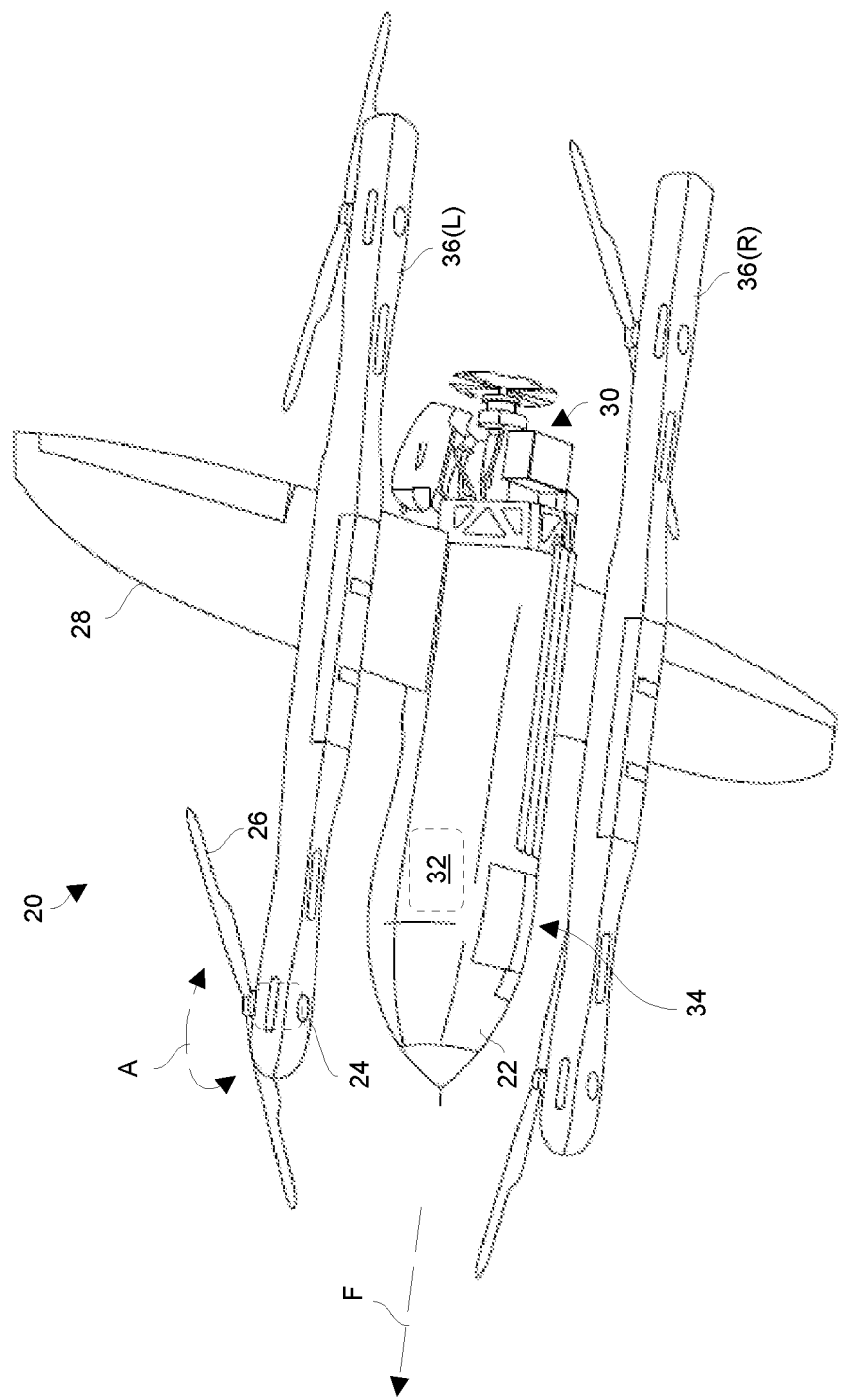
FIG. 5 is a second perspective view of the example aerial vehicle of FIG. 1.
Figure 6:
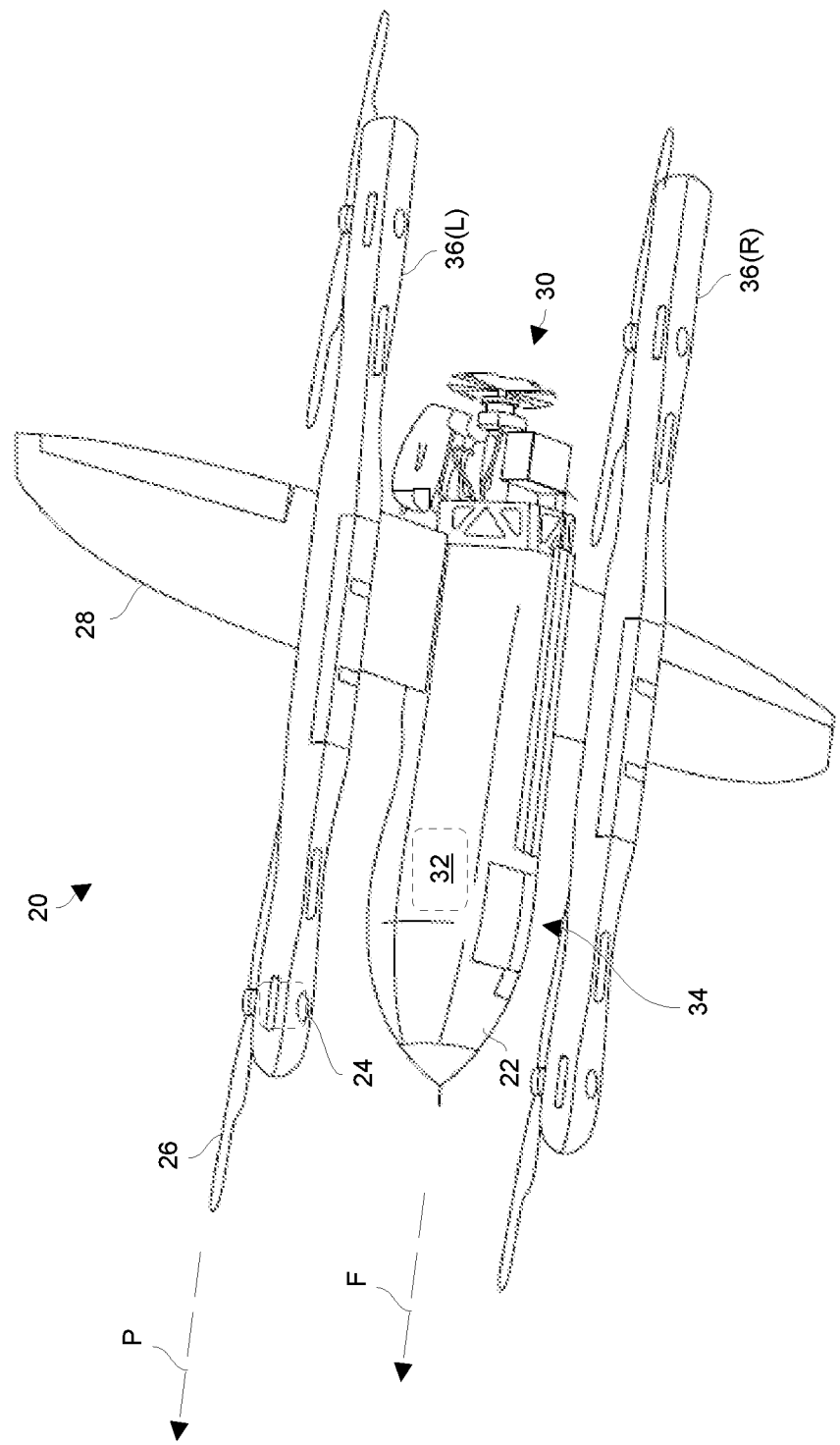
FIG. 6 is a third perspective view of the example aerial vehicle of FIG. 1.

FIGS. 4 through 6 provide further details in accordance with certain embodiments. FIG. 4 is a flowchart of a procedure 100 which is performed by control circuitry of the aerial vehicle 20 in accordance with certain embodiments. FIG. 5 shows certain details before the VTOL propellers 26 reach alignment. FIG. 6 shows certain details after the VTOL propellers 26 reach alignment. It should be understood that the particular geometry of the aerial vehicle 20 in FIGS. 5 and 6 is by way of example only, and that certain features such as the tail wing have been purposefully omitted to better illustrate certain propeller details.

With reference to FIG. 4, at 102, the control circuitry of the aerial vehicle 20 enables a VTOL propeller 26 to rotate freely. As described earlier, the VTOL propeller 26 is coupled with a VTOL motor 24. Accordingly, the VTOL propeller 26 may be allowed to rotate by simply shutting off the VTOL motor 24 after the aerial vehicle 20 takes off and is in forward horizontal flight (see the dashed arrow F in FIGS. 5 and 6).

It should be understood that while the VTOL propeller 26 is allowed to rotate freely, the wind encountered by the VTOL propeller 26 may cause the VTOL propeller 26 to turn arbitrarily in either direction (see the dashed double arrow A in FIG. 5). However, during this time, the control circuitry of the aerial vehicle 20 receives a signal indicating position status of the VTOL propeller 26 (e.g., see signal 70 in FIG. 2). In some arrangements, the control circuitry is able to identify the precise axial orientation of the VTOL propeller 26. In other arrangements, the control circuitry simply senses whether or not the VTOL propeller 26 is aligned with the direction of flight (arrow F).

At 104, the control circuitry detects when the VTOL propeller 26 rotates into alignment with the direction of flight (arrow F) for the aerial vehicle 20. That is, the VTOL propeller 26 reaches a particular predefined angular orientation (arrow P in FIG. 6) which is parallel to the forward direction (arrow F). As described earlier, there are a variety of suitable methodologies for making such a detection (e.g., optical sensing, electrical sensing, Hall sensing, and so on) and such sensing may be performed on the VTOL propeller 26, the VTOL motor 24 that is coupled with the VTOL propeller 26, combinations thereof, etc. (also see FIG. 3).

At 106, in response to detecting that the VTOL propeller 26 has rotated to the predefined position, the control circuitry provides a load from the VTOL motor 24 that inhibits further rotation of the VTOL propeller 26. Along these lines, the control circuitry may short the multi-phase terminals of the VTOL motor 24 together to generate the load (e.g., see signal 80 in FIG. 2). As a result, the VTOL propeller 26 is now aligned with the direction of flight (arrow F) and provides minimal drag/interference while the aerial vehicle 20 remains in forward horizontal flight.

It should be understood that the control circuitry of the aerial vehicle performs the procedure 100 for each rotor assembly 40. Accordingly, even though there may be a short period of time in which the VTOL propeller 26 of each rotor assembly 40 points in a random direction (FIG. 5), the control circuitry is able to quickly align the VTOL propeller 26 of each rotor assembly 40 (arrow P in FIG. 6) with the direction of forward flight (arrow F in FIG. 6). Moreover, the aligning process may be performed simultaneously for each VTOL propeller 26. Further details will now be provided with reference to FIG. 7.

Figure 7:
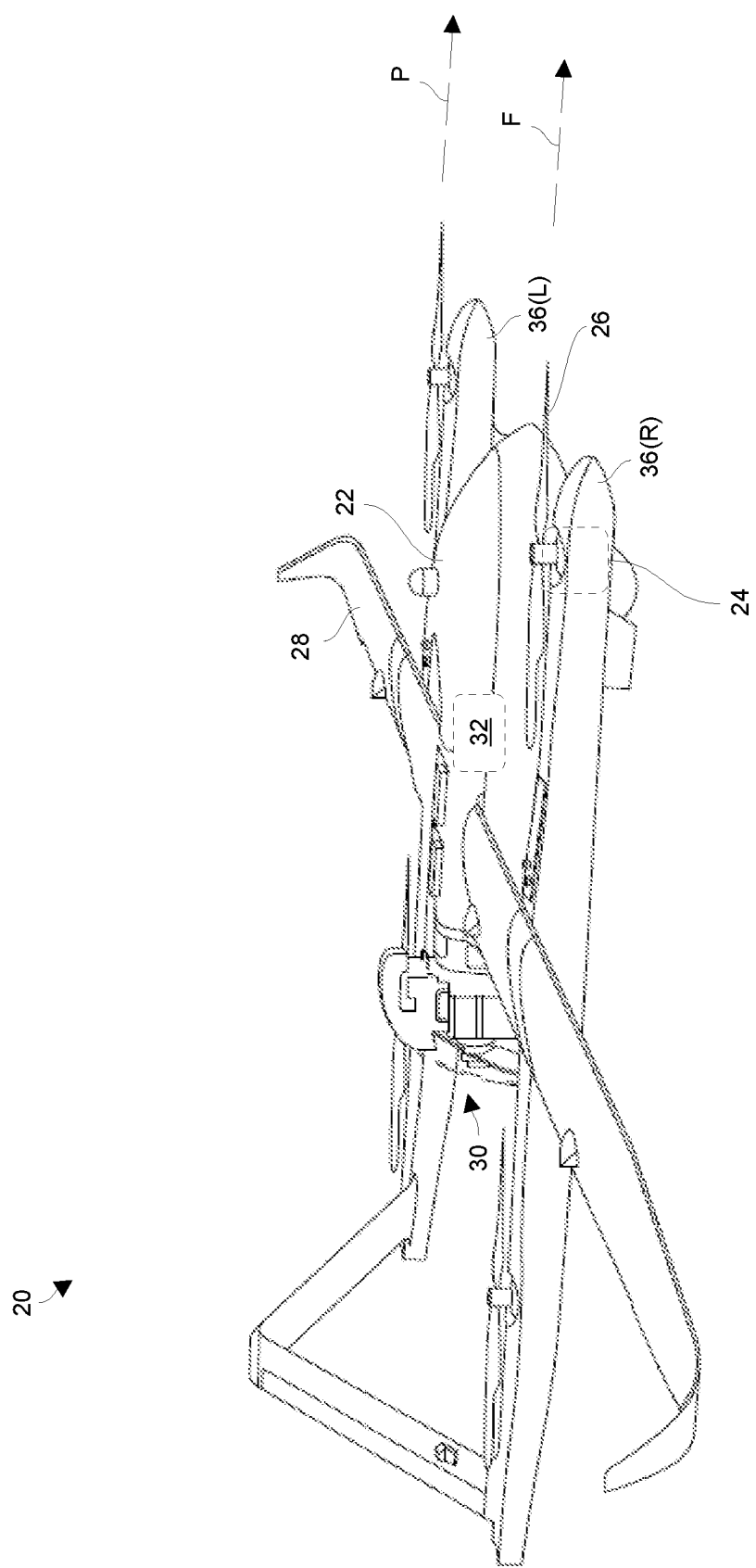
FIG. 7 is a fourth perspective view of the example aerial vehicle of FIG. 1.

FIG. 7 shows the aerial vehicle 20 from a reverse angle to illustrate further propeller alignment details. In particular, the blades of each VTOL propeller 26 are aligned (arrow P) with the forward direction for horizontal flight (arrow F) while the aerial vehicle 20 is in forward horizontal flight. Further details will now be provided with reference to FIG. 8.

Figure 8:
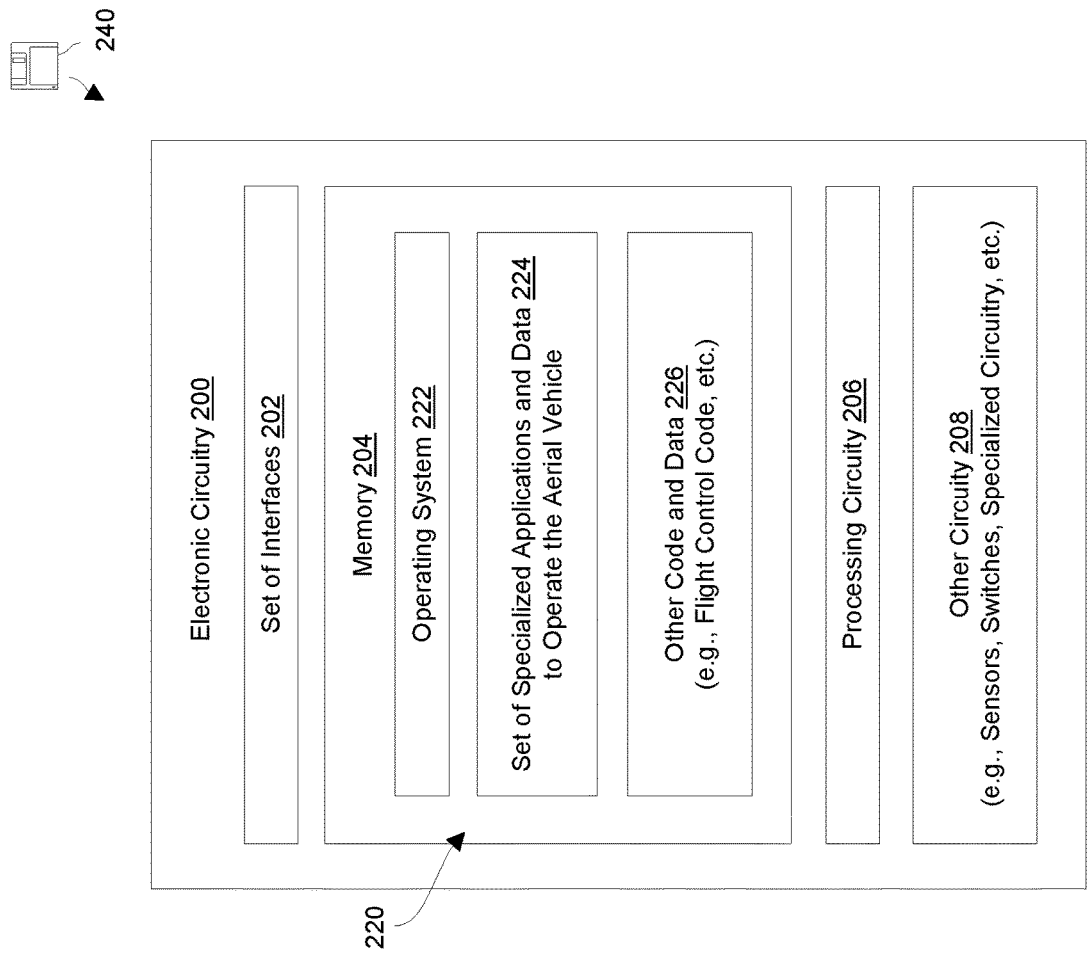
FIG. 8 is a block diagram of particular details of which is suitable for an aerial vehicle in accordance with certain embodiments.

FIG. 8 shows electronic circuitry 200 which is suitable for at least a portion of above-mentioned control circuitry (also see the specialized circuitry 50 in FIG. 2). The electronic circuitry 200 includes a set of interfaces 202, memory 204, and processing circuitry 206, and other circuitry 208.

The set of interfaces 202 is constructed and arranged to connect the electronic circuitry 200 to other devices. Such devices may be local (i.e., onboard) such as other payload equipment, and/or remote such as a base station, another aerial vehicle, etc. In the context of wireless radio communications, the set of interfaces 202 may include an antenna, an RF transceiver, etc. to provide robust and reliable communications with one or more external apparatus.

The memory 204 is intended to represent both volatile storage (e.g., DRAM, SRAM, etc.) and non-volatile storage (e.g., flash memory, magnetic memory, etc.). The memory 504 stores a variety of software constructs 220 including an operating system 222, specialized instructions and data 224, and other code and data 226. The operating system 222 refers to particular control code such as a kernel to manage computerized resources (e.g., processor cycles, memory space, etc.), drivers, and so on. The specialized instructions and data 224 refers to particular control code for, among other things, controlling alignment of the VTOL propellers 26 during flight. In some arrangements, the specialized instructions and data 224 is tightly integrated with or part of the operating system 222 itself. The other code and data 226 refers to applications and routines to provide additional operations (e.g., a flight control code to execute a flight plan, etc.), utilities (e.g., to monitor direction, altitude, air speed, fuel status, etc.), and so on.

The processing circuitry 206 is constructed and arranged to operate in accordance with the various software constructs 220 stored in the memory 204. As described herein, the processing circuitry 206 executes the operating system 222 and the specialized code 224 to form specialized circuitry that robustly and reliably controls operation of each rotor assembly 40 (e.g., see the specialized circuitry 50 in FIG. 2). Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may include sensors to sense axial orientation of the VTOL propellers 26, switches to control connection of power leads of the VTOL motors 24, and other circuitry (e.g., GPS circuitry, lights, LIDAR, specialized equipment, etc.).

As described above, improved techniques are directed to operating an aerial vehicle 20 in a manner that provides a mechanical load (or brake) from VTOL motor 24 to inhibit further rotation of a VTOL propeller 26. Such a load may be provided by simply connecting (or short circuiting) the terminals of the VTOL motor 24 together while the VTOL propeller 26 is aligned with the aerial vehicle's horizontal flight direction. Such connecting results in a mechanical resistance (or brake) applied by the VTOL motor 24, which now acts as a generator, that inhibits rotation of the VTOL propeller 26. As a result, the VTOL propeller 26 remains aligned in a manner that minimizes drag. Moreover, there is no need for magnets and the associated drawbacks.

While various embodiments of the present disclosure have been particularly shown and described, it will be understood by those skilled in the art that various changes in form and details may be made therein without departing from the spirit and scope of the present disclosure as defined by the appended claims.

For example, the control circuitry may continue to monitor alignment of each VTOL propeller 26 and if a VTOL propeller 26 becomes unaligned while the brake is applied to the VTOL propeller 26, the control circuitry may remove the brake from the VTOL propeller 26. As a result, the VTOL propeller 26 will again rotate freely and eventually re-align with the forward direction of the aerial vehicle 20. When the VTOL propeller 26 is again parallel with the forward direction, the control circuitry provides the brake again to inhibit further rotation.

In some arrangements, each VTOL motor of the set of VTOL motors: (i) is a multi-phase electric motor and (ii) has terminals to receive motor signals having different phases. Additionally, the controller, when providing a load from a VTOL motor that inhibits further rotation of a VTOL propeller coupled with the VTOL motor, is constructed and arranged to connect the terminals of the VTOL motor together to provide the load from the VTOL motor that inhibits further rotation of the VTOL propeller.

In some arrangements, the set of VTOL motors includes a first 3-phase brushless direct current (DC) motor that couples with a first VTOL propeller and a second 3-phase brushless DC motor that couples with a second VTOL propeller. Additionally, the controller is constructed and arranged to:
(i) electrically connect the terminals of the first 3-phase brushless DC motor to each other in response to the first VTOL propeller aligning with the direction of flight for the aerial vehicle, and
(ii) electrically connect terminals of the second 3-phase brushless DC motor to each other in response to the second VTOL propeller aligning with the direction of flight for the aerial vehicle.

In some arrangements, the VTOL motors includes a third 3-phase brushless DC motor that couples with a third VTOL propeller and a fourth 3-phase brushless DC motor that couples with a fourth VTOL propeller. Additionally, the controller is constructed and arranged to:
(i) electrically connect terminals of the third 3-phase brushless DC motor to each other in response to the third VTOL propeller aligning with the direction of flight for the aerial vehicle, and
(ii) electrically connect terminals of the fourth 3-phase brushless DC motor to each other in response to the fourth VTOL propeller aligning with the direction of flight for the aerial vehicle.

Furthermore, (i) the first and second 3-phase brushless DC motors are constructed and arranged to provide vertical lift to a left side of the aerial vehicle and (ii) the third and fourth 3-phase brushless DC motors are constructed and arranged to provide vertical lift to a right side of the aerial vehicle in a quadcopter configuration.

In some arrangements, the control circuitry, when enabling a VTOL propeller coupled with a VTOL motor to rotate freely, is constructed and arranged to terminate delivery of electric power to the VTOL motor to allow the VTOL propeller to rotate freely. Along these lines, the control circuitry may simply turn off the VTOL motor.

In some arrangements, the control circuitry, when detecting when a VTOL propeller coupled with a VTOL motor rotates to a predefined position relative to a direction of flight for the aerial vehicle, is constructed and arranged to sense when the VTOL propeller aligns with the direction of flight for the aerial vehicle. Such sensing may be on the VTOL motor and/or the VTOL propeller and/or on the frame of the aerial vehicle.

In some arrangements, each VTOL propeller includes a center axis, a first blade that extends outwardly from the center axis, and a second blade that extends outwardly from the center axis in a direction that is opposite that of the first blade. Additionally, the control circuitry, when sensing when a VTOL propeller aligns with the direction of flight for the aerial vehicle, is constructed and arranged to identify when the first and second blades of the VTOL propeller extend along an axis that is parallel to the direction of flight for the aerial vehicle.

In some arrangements, the frame includes a fixed wing. Additionally, the aerial vehicle further includes a set of horizontal propulsion devices supported by the frame, the set of horizontal propulsion devices being constructed and arranged to provide horizontal propulsion to the aerial vehicle enabling the fixed wing to generate lift for fixed wing flight.

In some arrangements, the frame further includes a left beam and a right beam. The left beam fastens to a left side of the fixed wing and supports a first set of the VTOL motors. The right beam fastens to a right side of the fixed wing and supports a second set of the VTOL motors.

In some arrangements, the set of horizontal propulsion devices includes a horizontal electric motor that is different from the VTOL motors, and a horizontal flight propeller coupled with the horizontal electric motor. The horizontal flight propeller is different from the VTOL propellers.

In some arrangements, the control circuitry is further constructed and arranged to operate the set of VTOL motors to execute vertical takeoff and landing maneuvers. In some arrangements, the control circuitry is further constructed and arranged to, after executing a vertical takeoff maneuver and before executing a vertical landing maneuver, operate the horizontal electric motor to provide fixed wing horizontal flight while simultaneously providing loads from the set of VTOL motors to inhibit further rotation of the set of VTOL propellers.

In some arrangements, enabling the VTOL propeller to rotate freely includes turning off the VTOL motor. Additionally, prior to enabling the VTOL propeller of the aerial vehicle to rotate freely, the control circuitry operates the VTOL motor to propel the aerial vehicle in an upward direction for vertical takeoff. Furthermore, after providing the load from the VTOL motor that inhibits further rotation of the VTOL propeller, the control circuitry turns the VTOL motor back on and operating the VTOL motor to perform a vertical landing.

In some arrangements, detecting when the VTOL propeller rotates to the predefined position relative to the direction of flight involves sensing an axial orientation of a rotor of the VTOL motor relative to a stator of the VTOL motor while the VTOL motor is turned off.

In some arrangements, the horizontal propulsion motor has an axis of rotation of that is perpendicular to an axis of rotation of the 3-phase brushless DC motor. It should be understood that the axes may not be precisely at 90 degrees to each other, but instead the vertical lift motor may be slightly canted from the horizontal plane (e.g., angled slightly inward) to allow for a small amount of yaw control during the VTOL phase.

As described herein and in accordance with certain embodiments, improved technique involve an electric motor alignment brake system.

Along these lines, certain improvements relate generally to the field of electric motor controls, and specifically to variable speed DC motor control for propellers or any motor driven object needing alignment while not under powered rotation.

It should be understood that hybrid quadcopter unmanned aerial vehicles (UAVs) with quad electric motors for vertical takeoff and landing (VTOL) and forward motors for forward flight ideally should align the VTOL propellers in the direction of flight to minimize drag during forward flight.

One approach method may be to use a mechanical brake system. However, such an approach is mechanically complicated and adds weight.

Another approach is to use magnets on the mounting base to align with magnets on the rotating components or propeller that will magnetically align the propeller when the motors are not powered. This magnetic approach may be very simple, but may cause vertical stresses on the motors while spinning which leads to increased noise, frictional losses, and motor bearing wear.

Most standard quad electric UAVs use brushless three phase motors. Those motors are also generators when spun. The mechanical load on a generator shaft is inversely proportional to the electrical resistance or impedance presented on the generator (motor) power leads.

In accordance with certain embodiments, if the generator (motor) leads are shorted together, such shorting presents a very significant load to the generator and the generator (motor) becomes sufficiently difficult to spin such that it can maintain alignment in the presence of moderate-to-high forces such as those caused by the wind in forward UAV flight. Such shorting may be performed by simply adding a shorting mechanism such as a switch which may be solid state, electro-mechanical, combinations thereof, etc.

After power to the motor has been shut off after the vertical takeoff portion of a UAV flight, the airflow from forward flight will free spin the propeller and motor shaft. The shaft position of the motor, which indicates the propeller position, can be monitored by any standard means. When the shaft rotates to the desired alignment position, a short circuit is applied electrically between the motor leads to create a high load to the motor—now a generator—to freeze the propeller in the desired orientation. Such locking or braking holds the propeller in the aligned orientation for minimal drag during horizontal flight.

When ready for motor operation again, the short circuit is released and the motor is operated normally. Such operation enables the UAV to perform other maneuvers such as vertical landing.

Such a technique can be performed individually for each rotor assembly of the UAV. Moreover, such a technique can also be applied to other systems using motors that would free spin when shut off but require alignment. Rotating outdoor signage, conveyer systems, or electric wheeled systems are examples.

In accordance with some embodiments, control of the VTOL rotors may involve remote control by a ground control station via ground control station operator commands. In such a situation, control may involve both autopilot circuitry on the aircraft and ground processors and circuitry communicating with the aircraft by radio signals or other means of remote communication.

In some arrangements, the autopilot circuitry in the aircraft generally keeps the aircraft in control and makes the aircraft do what the operators ask (e.g., executes maneuvers). Here, there may be ground control station software that converts an operator's mouse and keyboard commands into control messages for the aircraft, which would include commands to take off/land/go to forward flight and so on. Such modifications and enhancements are intended to belong to various embodiments of the disclosure.

What is claimed is:

1. An aerial vehicle with vertical takeoff and landing (VTOL) capabilities, the aerial vehicle comprising: a frame; a VTOL motor supported by the frame; a VTOL propeller coupled with the VTOL motor; and a controller supported by the frame, the controller being constructed and arranged to perform a method of: enabling the VTOL propeller coupled with the VTOL motor to rotate freely, detecting when the VTOL propeller coupled with the VTOL motor rotates to a predefined position relative to a direction of flight for the aerial vehicle, and in response to detecting that the VTOL propeller coupled with the VTOL motor has rotated to the predefined position, providing a load from the VTOL motor that inhibits further rotation of the VTOL propeller coupled with the VTOL motor; wherein the VTOL motor is a multi-phase electric motor having terminals to receive motor signals having different phases; wherein the terminals of the multi-phase electric motor are not connected to each other while enabling the VTOL propeller to rotate freely; and wherein the providing the load from the VTOL motor includes: connecting the terminals of the multi-phase electric motor together to provide the load from the VTOL motor that inhibits further rotation of the VTOL propeller.

2. An aerial vehicle as in claim 1 wherein the VTOL motor is among a plurality of VTOL motors which includes a first 3-phase brushless direct current (DC) motor that couples with a first VTOL propeller and a second 3-phase brushless DC motor that couples with a second VTOL propeller; and
  wherein the controller is constructed and arranged to:
    electrically connect the terminals of the first 3-phase brushless DC motor to each other in response to the first VTOL propeller aligning with the direction of flight for the aerial vehicle, and
    electrically connect terminals of the second 3-phase brushless DC motor to each other in response to the second VTOL propeller aligning with the direction of flight for the aerial vehicle.

3. An aerial vehicle as in claim 2 wherein the VTOL motors includes a third 3-phase brushless DC motor that couples with a third VTOL propeller and a fourth 3-phase brushless DC motor that couples with a fourth VTOL propeller;
wherein the controller is constructed and arranged to:
electrically connect terminals of the third 3-phase brushless DC motor to each other in response to the third VTOL propeller aligning with the direction of flight for the aerial vehicle, and
electrically connect terminals of the fourth 3-phase brushless DC motor to each other in response to the fourth VTOL propeller aligning with the direction of flight for the aerial vehicle; and
wherein (i) the first and second 3-phase brushless DC motors are constructed and arranged to provide vertical lift to a left side of the aerial vehicle and (ii) the third and fourth 3-phase brushless DC motors are constructed and arranged to provide vertical lift to a right side of the aerial vehicle in a quadcopter configuration.

4. An aerial vehicle as in claim 1 wherein the control circuitry, when enabling a VTOL propeller coupled with a VTOL motor to rotate freely, is constructed and arranged to:
terminate delivery of electric power to the VTOL motor to allow the VTOL propeller to rotate freely.

5. An aerial vehicle as in claim 4 wherein the control circuitry, when detecting when a VTOL propeller coupled with a VTOL motor rotates to a predefined position relative to a direction of flight for the aerial vehicle, is constructed and arranged to:
sense when the VTOL propeller aligns with the direction of flight for the aerial vehicle.

6. An aerial vehicle as in claim 5 wherein each VTOL propeller includes a center axis, a first blade that extends outwardly from the center axis, and a second blade that extends outwardly from the center axis in a direction that is opposite that of the first blade; and
wherein the control circuitry, when sensing when a VTOL propeller aligns with the direction of flight for the aerial vehicle, is constructed and arranged to:
identify when the first and second blades of the VTOL propeller extend along an axis that is parallel to the direction of flight for the aerial vehicle.

7. An aerial vehicle as in claim 1 wherein the frame includes a fixed wing; and
wherein the aerial vehicle further comprises:
a set of horizontal propulsion devices supported by the frame, the set of horizontal propulsion devices being constructed and arranged to provide horizontal propulsion to the aerial vehicle enabling the fixed wing to generate lift for fixed wing flight.

8. An aerial vehicle as in claim 7 wherein the frame further includes:
a left beam that fastens to a left side of the fixed wing, the left beam supporting a first set of the VTOL motors, and
a right beam that fastens to a right side of the fixed wing, the right beam supporting a second set of the VTOL motors.

9. An aerial vehicle as in claim 7 wherein the set of horizontal propulsion devices includes:
a horizontal electric motor that is different from the VTOL motors, and
a horizontal flight propeller coupled with the horizontal electric motor, the horizontal flight propeller being different from the VTOL propellers.

10. An aerial vehicle as in claim 9 wherein the control circuitry is further constructed and arranged to:
operate the set of VTOL motors to execute vertical takeoff and landing maneuvers.

11. An aerial vehicle as in claim 9 wherein the control circuitry is further constructed and arranged to:
after executing a vertical takeoff maneuver and before executing a vertical landing maneuver, operate the horizontal electric motor to provide fixed wing horizontal flight while simultaneously providing loads from the set of VTOL motors to inhibit further rotation of the set of VTOL propellers.

12. A method of operating an aerial vehicle, comprising:
enabling a vertical takeoff and landing (VTOL) propeller of the aerial vehicle to rotate freely, the VTOL propeller being coupled with a VTOL motor; detecting when the VTOL propeller rotates to a predefined position relative to a direction of flight for the aerial vehicle; and in response to detecting that the VTOL propeller has rotated to the predefined position, providing a load from the VTOL motor that inhibits further rotation of the VTOL propeller; wherein the VTOL motor is a multi-phase electric motor having terminals to receive motor signals having different phases; wherein the terminals of the multi-phase electric motor are not connected to each other while enabling the VTOL propeller to rotate freely; and wherein the providing the load from the VTOL motor includes: connecting the terminals of the multi-phase electric motor together to provide the load from the VTOL motor that inhibits further rotation of the VTOL propeller.

13. A method as in claim 12 wherein the multi-phase electric motor is a 3-phase brushless direct current (DC) motor having (i) a first set of windings and a first terminal leading to the first set of windings for a first phase, (ii) a second set of windings and a second terminal leading to the second set of windings for a second phase, and (iii) a third set of windings and a third terminal leading to the third set of windings for a third phase; and
wherein connecting the terminals of the multi-phase electric motor to each other includes:
electrically shorting the first terminal, the second terminal,
and the third terminal together through a node that is external to the 3-phase brushless DC motor.

14. A method as in claim 13, further comprising:
while electrically shorting the first terminal, the second terminal, and the third terminal together, flying the aerial vehicle in a horizontal direction.

15. A method as in claim 14 wherein the aerial vehicle includes a set of fixed wings for horizontal flight; and
wherein flying the aerial vehicle in the horizontal direction includes:
operating a horizontal propulsion motor that rotates a horizontal propulsion propeller to propel the aerial vehicle horizontally to obtain lift from the set of fixed wings, the horizontal propulsion motor having an axis of rotation of that is perpendicular to an axis of rotation of the 3-phase brushless DC motor.

16. A method as in claim 12 wherein enabling the VTOL propeller to rotate freely includes:
turning off the VTOL motor; and
wherein the method further comprises:
prior to enabling the VTOL propeller of the aerial vehicle to rotate freely, operating the VTOL motor to propel the aerial vehicle in an upward direction for vertical takeoff, and
after providing the load from the VTOL motor that inhibits further rotation of the VTOL propeller, turning the VTOL motor back on and operating the VTOL motor to perform a vertical landing.

17. A method as in claim 12 wherein detecting when the VTOL propeller rotates to the predefined position relative to the direction of flight includes:

sensing an axial orientation of a rotor of the VTOL motor relative to a stator of the VTOL motor while the VTOL motor is turned off.

18. A computer program product having a non-transitory computer readable medium which stores a set of instructions to operate an aerial vehicle; the set of instructions, when carried out by computerized circuitry, causing the computerized circuitry to perform a method of: enabling a vertical takeoff and landing (VTOL) propeller of the aerial vehicle to rotate freely, the VTOL propeller being coupled with a VTOL motor; detecting when the VTOL propeller rotates to a predefined position relative to a direction of flight for the aerial vehicle; and in response to detecting that the VTOL propeller has rotated to the predefined position, providing a load from the VTOL motor that inhibits further rotation of the VTOL propeller; wherein the VTOL motor is a multi-phase electric motor having terminals to receive motor signals having different phases; wherein the terminals of the multi-phase electric motor are not connected to each other while enabling the VTOL propeller to rotate freely; and wherein the providing the load from the VTOL motor includes: connecting the terminals of the multi-phase electric motor together to provide the load from the VTOL motor that inhibits further rotation of the VTOL propeller.

19. An aerial vehicle in claim 1 wherein connecting the terminals of the multi-phase electric motor together includes:

short circuiting the terminals of the multi-phase electric motor together while the VTOL motor is turned off.

20. A method as in claim 12 wherein connecting the terminals of the multi-phase electric motor together includes:

short circuiting the terminals of the multi-phase electric motor together while the VTOL motor is turned off.

* * * * *